United States Patent [19]

Nagano et al.

[11] 4,174,677

[45] Nov. 20, 1979

[54] DEVICE FOR CROSS-LINKING OF COATING MATERIAL SUCH AS RUBBER OR PLASTIC, FOR ELECTRIC WIRE

[75] Inventors: Hiroo Nagano; Chuki Ikeda; Kenji Takahashi; Naoyoshi Kato; Norio Sato, all of Hitachi, Japan

[73] Assignee: Hitachi Cable, Ltd., Japan

[21] Appl. No.: 872,768

[22] Filed: Jan. 27, 1978

Related U.S. Application Data

[62] Division of Ser. No. 496,898, Aug. 12, 1974, abandoned.

[30] Foreign Application Priority Data

Sep. 18, 1973 [JP] Japan .................... 48-109598

[51] Int. Cl.² ............................................ B05C 11/00
[52] U.S. Cl. .............................................. 118/67; 34/66; 118/69
[58] Field of Search .................. 118/67, 69, 68, 61; 34/66, 82, 77; 165/66

[56] References Cited

U.S. PATENT DOCUMENTS

| | | | |
|---|---|---|---|
| 2,361,350 | 10/1944 | Keep et al. | 118/61 |
| 2,434,169 | 1/1948 | Larsen | 118/67 X |
| 3,513,228 | 5/1970 | Miyauchi et al. | 264/25 |
| 3,588,954 | 6/1971 | Nakamura et al. | |
| 3,635,621 | 1/1972 | Miyauchi et al. | 425/113 |

*Primary Examiner*—John P. McIntosh
*Attorney, Agent, or Firm*—Craig and Antonelli

[57] ABSTRACT

A device for cross-linking of coating material such as rubber or plastic having a vertical or inclined cross-linking tube including a heating portion and a succeeding cooling portion, said heating portion comprising at the side thereof a gas circulating passage having a gas supply device, a gas heating device, a gas cooling device and a filter, said gas circulating passage communicating with an exhaust port above the heating portion and with a gas supply port below the heating portion so that the gas circulate in a direction opposed to the traveling direction of a conducting strand passing therethrough, whereby said conductive strand is heated and cross-linked while residue emitted from the coating material of said conductive strand is effectively removed.

10 Claims, 1 Drawing Figure

U.S. Patent   Nov. 20, 1979   4,174,677
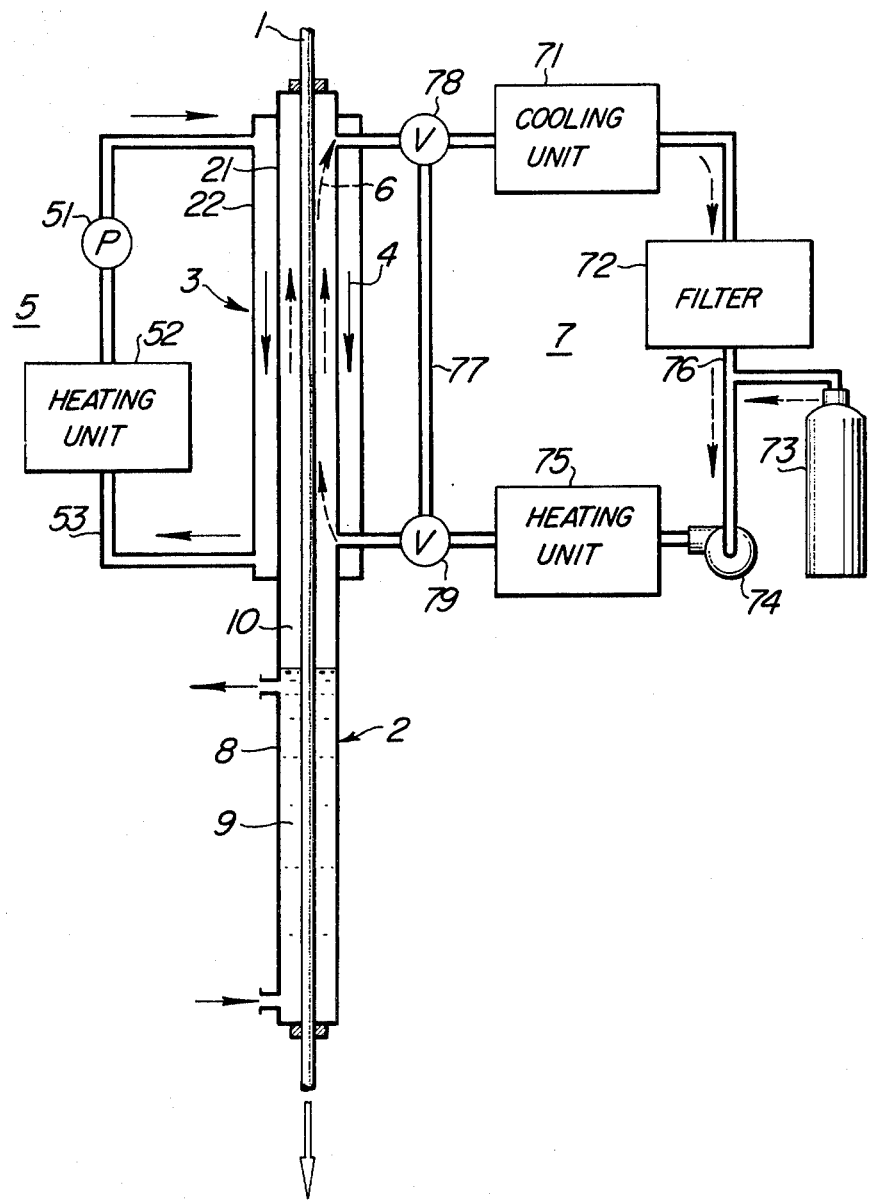

DEVICE FOR CROSS-LINKING OF COATING MATERIAL SUCH AS RUBBER OR PLASTIC, FOR ELECTRIC WIRE

CROSS-REFERENCE TO RELATED APPLICATION

This application is a division of application Ser. No. 496,898 filed Aug. 12, 1974 and now abandoned.

This invention relates to an apparatus for producing an electric wire having a coating of rubber or plastic thereon, and a device therefor, and more particularly to a method for causing the cross-linking of a coating material covering a conductive strand and a device therefor.

The conventional method for producing an electric wire having a coating of rubber and plastic has been such that rubber or plastic not subjected to cross-linking is coated by extrusion around a conductive material, and then the coated electric wire is caused to pass through a declined or vertical type cross-linking tube, in which high pressure steam and a cooling liquid are charged, thereby being heated for cross-linking. Heating by means of steam, of the coated wire is accompanied by drawbacks that water drop and oxygen contained in steam adversely affect on the insulating coating material, a required high temperature is hard to obtain, and if a required high temperature should be obtained, heat control of steam is rather difficult, unless a dimension of a heating section is increased, resulting in increase in an over-all length of a cross-linking tube.

It is accordingly an object of the present invention to provide an improved apparatus for efficiently producing an electric wire having a coating of rubber or plastic thereon, which would not adversely affect the characteristics, and a device for embodying the method.

The above-described object is attained by a method for producing a coated electric wire which comprises the steps of passing a conductive body having a coating of cross-linkable rubber or plastic through a high temperature inactive gas, for example nitrogen gas, or a high temperature electrically negative gas, for example SF6 gas, in a manner to travel in a direction against the stream of such high temperature gas, thereby causing the cross-linking of a coating material such as rubber or plastic, followed by cooling of same. The method is practiced by a device comprising a cross-linking tube, which consists of a heating portion, in which a high temperature gas is charged, and a cooling portion continuous with the heating portion, in which a cooling liquid is charged, the aforesaid heating portion having an exhaust port provided in its upper portion and communicated with a gas heating unit, and an air supply port provided in the lower portion spaced apart from the level of cooling liquid, said air supply port being communicated with the aforesaid gas heating unit.

Description will hereunder be given to an embodiment of the present invention with reference to the accompanying drawing which illustrates the outline of a device practicing a method for producing an electric wire having a coating of rubber or plastic thereon according to the present invention.

The FIGURE shows the claimed apparatus for cross linking the coating on a wire.

The FIGURE is a conductive strand, such as a copper strand, tinned copper strand or aluminum strand, having a coating of cross-linkable rubber or plastic thereon. Included by cross-linkable rubber or plastic which are employable in the present invention are polyethylene containing organic peroxide as a cross-linking agent, ethylene copolymer, ethylene propylene rubber, butyl rubber, styrene butadiene rubber and chloroprene rubber. The rubber- or plastic-coated conductive strand 1 is introduced in a cross-linking tube 2 and then into a heating portion 3 thereof, from an extruding machine (not shown) provided above the cross-linking tube. The conductive strand 1 may have a single or two semi-conductive layers applied under, or both under and over on the layer of rubber or plastic coating. These semi-conductive layers should be applied to the conductive strand prior to or after application of rubber or plastic coating thereto.

The heating portion 3 is of a double-tube construction consisting of an inner tube 21 and an outer tube 22, between which is charged an organic heating medium, for example, alkyldiphenyl 4 heated to 280° C. Charged in the inner tube 21 is nitrogen gas heated to an elevated temperature, for example to 250° C. The inner tube 21 and outer tube 22 are communicated with circulating passages 5 and 7 respectively provided sideways thereof.

The circulating passage 5 includes a pump 51, a heating unit 52 and a conduit 53 having opposite end openings communicated with the upper and lower portions of outer tube 22. Thus, the heating medium 4 which has been delivered and heated by the pump 51 and the heating unit 52, respectively, is circulated in the direction of arrows, thereby maintaining the heating portion 3 constantly at an elevated temperature. The use of organic heating medium 4 facilitates to raise temperature in the heating portion to a higher degree, as compared with the use of steam, as well as maintenance and control for the heating portion.

The circulating passage 7 consists of a cooling unit 71, a filter 72, a nitrogen gas cylinder 73, a blower 74, a heating unit 75, a conduit 76 and a by-pass conduit 77. The conduit 76 has opposite end openings leading to the inner tube 21 in the vicinity of the upper and lower portion of outer tube 22. The upper opening of conduit 76 serves as an exhaust port, while the lower opening serves as an air supply port. Interposed in the connecting portion of the conduit 76 with the by-pass conduit 77 are valves 78 and 79. The valves 78 and 79 normally maintain the by-pass conduit 77 in cut-off state, with the main conduit 76 alone being maintained open, while these valves permit to function in a reversed manner when required. The by-pass conduit 77 and the valves 78 and 79 are extremely convenient for checking for respective units, confirming a gas density and temperature at the starting of process, as well as for causing the corss-linking of the coating material in the trailing end of coated electric wire.

If the valves 78 and 79 are switched, heated nitrogen gas 6 will be charged under pressure into the inner tube 21 from the lower portion thereof, whereby the electric wire 1 passing through the inner tube 21 is heated. Since the heating atmosphere is nitrogen gas heated to an elevated temperature, there is no possibility of deterioration in the coating material of electric wire 1 or lowered characteristic of the electric wire 1 due to moisture or oxygen. Furthermore, there is no possibility that the coating material is caused to foam due to gases produced by the action of a cross-linking agent contained in the coating material consisting of polyethylene. It suffices, if the pressure of heating atmosphere is more than 1 kg/cm², for example, 5 to 8 kg/cm². Such a value is far low, as compared with the value necessary for obtaining steam at the same temperature, and hence ready maintenance and control will result.

The same result is obtained by the use of SF6 gas as heating atmosphere. Nitrogen gas which has egressed from the heating portion 3 is returned via the circulating passage 7 to the heating portion. By virtue of the provisions of the cooling unit 71 on the side of exhaust port and the heating unit 75 on the side of gas supply port, nitrogen gas is convection-circulated through the inner tube 21. The stream of nitrogen gas flows in the direction opposite the travelling direction of the electric wire 1, such that the surface of electric wire 1, i.e. the surface of polyethylene coated on the conductive strand, may be subjected to the thermal action akin to the injection of nitrogen gas to be effectively heated, whereby cross-linking of the coating material is facilitated. The blower 74 interposed in the circulating passage 7 serves to facilitate circulation of nitrogen gas.

The cooling unit 71 is extremely useful for facilitating filtration of exhaust gases by means of the filter 72 for removal of cross-linking residue contained in exhaust gases or removal of moisture contained therein, besides co-acting with the heating unit 75. The cooling unit 71, thus, is utilized for pre-heating low temperature gas which is to be transferred to the heating unit 75.

The electric wire 1 which has been heated in the heating portion 3 further passes through the cooling portion 8 in which the cooling liquid 9 such as water or glycerine is charged, whereby the cross-linking is completed, and then the electric wire 1 withdrawn from the cross-linking tube 2 to the outside.

The gas supply port provided in the heating portion is located upwardly of the normal level of cooling liquid, so that a major part of gas supplied thereto will be streamed upwards. Consequently, a space is left between the heating portion 3 and the cooling portion 8. The space reserves therein steam originating from the electric wire 1 when same passes the cooling portion, so as to prevent ingress of steam into the heating portion. In addition, the space is maintained at an average temperature of those in the heating portion 3 and cooling portion 8, so as to relieve the coating of electric wire 1 of being subjected to the severe thermal hysteresis due to a large temperature difference between two portions. It does not matter that atmosphere in the space 10 is circulated in the direction opposite the stream of nitrogen gas in the heating portion 3, for removal of moisture or cross-linking residue contained in the atmosphere.

As is apparent from the foregoing, according to the present invention, high temperature gas is used for causing the cross-linking of a coating material, such that an electric wire presenting a desired characteristic may be produced, with the freedom of influence due to water drop or oxygen. In addition, the electric wire to be cross-linked travels in a direction against the gas stream, and so the heating to the electric wire is effectively conducted, resulting in increase in the travelling speed of electric wire relative to the gas stream and in reduction in the longitudinal length of heating portion. The device for embodying the method comprises the gas supply passage for permitting convection-circulation of gas to the heating portion. This facilitates heat control and maintenance in the heating portion as well as removal of cross-linking residue from exhaust gases, and thus gas discharged from the heating portion is effectively used. Furthermore, the space is formed between the heating portion and the cooling portion of cross-linking tube for preventing ingress of steam from the cooling liquid into the heating portion as well as relieving thermal hysteresis, with the assurance of production of an electric wire presenting a good characteristic, with high efficiency.

The cross-linking tube used in the embodiment shown is of a vertical type and it may be of a inclined type.

What is claimed is:

1. A device for cross-linking of a coating material such as rubber of plastic of an electric wire including a cross-linking tube comprising:

a heating portion through which either one of high temperature inactive gas or high temperature electrically negative gas is passed; and a cooling portion located below and continuous with said heating portion and filled with cooling liquid;

wherein said heating portion is provided at the side thereof with a gas circulating passage having an inlet port and an outlet port, said inlet port and said outlet port of said gas circulating passage communicating with a gas exhaust port above said heating portion and a gas supply port below said heating portion respectively, said gas circulating passage having a gas cooling device, a gas cleaning filter, a pressurized gas supply device, a blower for circulating the gas and a gas heating device arranged in the indicated order from the inlet port of said gas circulating passage to the outlet port thereof, the gas being circulated in a direction opposed to the travelling direction of said electric wire passing through said heating portion downwardly from above.

2. A device for cross-linking of a coating material such as rubber or plastic of an electric wire as defined in claim 1, wherein said gas circulating passage is operatively associated with a bypass passage connected through valves to portions of said gas circulating passage near the inlet port and the outlet port of said gas circulating passage respectively.

3. A device for cross-linking of a coating material such as rubber or plastic of an electric wire as defined in claim 1, wherein said heating portion having at the outer periphery thereof a heating means, said heating portion being provided around the outer periphery thereof with temperature preserving means.

4. A device for cross-linking of a coating material such as rubber or plastic of an electric wire as defined in claim 3, wherein said temperature preserving means is a passage for an orgaic heat medium heated to an elevated temperature, said organic heat medium flowing in a direction opposite to the flow direction of said gas.

5. A device for cross-linking of a coating material such as rubber or plastic of an electric wire as defined in claim 1, wherein said heating portion is operatively associated with temperature preserving means, which surround said heating portion, said gas circulating passage having between both ends thereof a bypass passage including valve means for effecting flow of the gas through said bypass passage.

6. A device for cross-linking a coating material comprised of a cross-linkable rubber or plastic on a metal wire, which comprises:

(a) means for effecting cross-linking of said cross-linkable coating material and for defining a passage in which the coating material is cross-linked, said means including a tubular element having a heating portion at one end and a cooling portion located below and continuous with said heating portion, said cooling portion being filled with a cooling liquid;
(b) means for introducing the metal wire with said coating material into and through said heating portion of said tubular element and for withdrawing the metal wire with the coating material from said cooling portion of said tubular element;
(c) a gas circulating means for introducing a heated inert gas into an inlet port located at a lower part of the heating portion of said tubular element, along a length of the metal wire with coating material within said passage and for exhausting the inert gas from an exhaust port positioned at an upper end of the heating portion of the tubular element and for circulating the exhausted inert gas to the inlet port, said gas circulating means including a filter means for removing cross-linking residues contained in the exhausted gas as a result of the cross-linking of the coated material in said passage.

7. A device according to claim 6, further comprising a gas supply means for introducing the inert gas into said gas circulating means and for maintaining the gas under pressure.

8. A device according to claim 7, wherein said gas circulating passage includes a blower for circulating the gas, a gas cooling device located upstream of said means for removing cross-linking residues from said gas and a gas heating means adjacent to said inlet port for heating the gas immediately before entering into said heating portion of said tubular element.

9. A device according to claim 6, wherein said tubular element is provided with means for sealing the ends of the tubular element around the metal wire being introduced into said tubular element whereby the heated inert gas containing the cross-linking residues is maintained within said passage and said gas circulating means.

10. The device according to claim 6, wherein the level of cooling liquid maintained within the cooling portion of the tubular element is located below the inlet port for introducing heated inert gas into said passage, said inlet port being spaced sufficiently above said liquid level to provide a space between the heating portion and the cooling portion, said space providing means for retaining steam generated by the metal wire passing into the cooling liquid whereby the steam will not enter into the heating portion of said device.

* * * * *